US009361923B1

(12) United States Patent
Liu et al.

(10) Patent No.: US 9,361,923 B1
(45) Date of Patent: Jun. 7, 2016

(54) PP3 SHAPE DESIGNS FOR SHIELD DOMAIN CONTROL TO IMPROVE EITHER SKIP TRACK ERASURE (STE) OR WRITE PERFORMANCE FOR PERPENDICULAR MAGNETIC RECORDING (PMR)

(71) Applicant: Headway Technologies, Inc., Milpitas, CA (US)

(72) Inventors: Yue Liu, Fremont, CA (US); Moris Dovek, San Jose, CA (US); Glen Garfunkel, San Jose, CA (US); Yaguang Wei, Pleasanton, CA (US); Yuhui Tang, Milpitas, CA (US); Po-Kang Wang, Los Altos, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 14/690,609

(22) Filed: Apr. 20, 2015

(51) Int. Cl.
| G11B 5/127 | (2006.01) |
| G11B 5/60  | (2006.01) |
| G11B 5/31  | (2006.01) |
| G11B 5/11  | (2006.01) |

(52) U.S. Cl.
CPC ............ *G11B 5/6082* (2013.01); *G11B 5/1278* (2013.01); *G11B 5/3116* (2013.01); *G11B 5/3163* (2013.01); *G11B 5/11* (2013.01)

(58) Field of Classification Search
USPC ....................................................... 360/125.3
See application file for complete search history.

(56) References Cited

U.S. PATENT DOCUMENTS

| 7,821,736 | B2  | 10/2010 | Che et al. |
| 8,085,498 | B2* | 12/2011 | Bai .................. G11B 5/1278 360/125.03 |
| 8,218,264 | B1  | 7/2012  | Sasaki et al. |
| 8,243,560 | B2  | 8/2012  | Araki et al. |
| 8,270,110 | B2  | 9/2012  | Araki et al. |
| 8,274,758 | B2  | 9/2012  | Wu et al. |
| 8,274,759 | B1  | 9/2012  | Sasaki et al. |
| 8,289,649 | B2  | 10/2012 | Sasaki et al. |
| 8,295,008 | B1  | 10/2012 | Sasaki et al. |
| 8,300,357 | B1  | 10/2012 | Sasaki et al. |
| 8,345,381 | B1  | 1/2013  | Sasaki et al. |
| 8,345,382 | B1  | 1/2013  | Sasaki et al. |
| 8,593,761 | B1  | 11/2013 | Liu et al. |

(Continued)

OTHER PUBLICATIONS

Co-pending U.S. Appl. No. 14/819,534, filed Aug. 6, 2015, "Perpendicular Magnetic Recording (PMR) Write Head with Improved Shapes of Side Shield and Main Pole," by Yuhui Tang et al, 37 pgs.

*Primary Examiner* — Brian Miller
(74) *Attorney, Agent, or Firm* — Saile Ackerman LLC; Stephen B. Ackerman

(57) ABSTRACT

A shield structure for a PMR writer is disclosed and features a first trailing shield on a write gap, and a second (PP3) trailing shield on the first trailing shield and magnetically connected to the main pole layer. From a top-down view along the down-track direction, the PP3 trailing shield has various shapes to provide shape anisotropy such that following hard magnet or reverse magnet initialization, PP3 trailing shield magnetic orientation has a stable three domain configuration thereby minimizing skip track erasure (STE) or improving area density capability (ADC). At least one sloped side is introduced that forms an angle >90 degrees with the PP3 trailing shield backside. In other embodiments, a thinner leading shield may be used to improve STE. The PP3 trailing shield may have a dome shape or a planar shape from a down-track cross-sectional view.

8 Claims, 10 Drawing Sheets

(56) References Cited

U.S. PATENT DOCUMENTS

| | | |
|---|---|---|
| 8,675,307 B2 | 3/2014 | Gao et al. |
| 8,767,347 B1 * | 7/2014 | Sasaki .................. G11B 5/1278 360/123.06 |
| 8,879,208 B1 * | 11/2014 | Liu .......................... G11B 5/11 360/125.3 |
| 2007/0177301 A1 * | 8/2007 | Han ........................ G11B 5/11 360/125.3 |
| 2007/0291409 A1 * | 12/2007 | Sasaki .................. G11B 5/1278 360/125.02 |
| 2012/0295132 A1 | 11/2012 | Min et al. |

\* cited by examiner

PP3 SHAPE DESIGNS FOR SHIELD DOMAIN CONTROL TO IMPROVE EITHER SKIP TRACK ERASURE (STE) OR WRITE PERFORMANCE FOR PERPENDICULAR MAGNETIC RECORDING (PMR)

RELATED PATENT APPLICATIONS

This application is related to the following: U.S. Pat. No. 8,274,758 and U.S. Pat. No. 8,593,761; both assigned to a common assignee and herein incorporated by reference in their entirety.

TECHNICAL FIELD

The present disclosure relates to a trailing shield (PP3) design above a write shield and main pole layer in a PMR write head wherein the PP3 shield design is compatible with either hard magnet initialization (HMI) or reverse magnet initialization (RMI) to provide improved control of PP3 trailing shield and write shield magnetization orientation to either enhance area density capability (ADC) or reduce skip track erasure (STE) with a slight trade off in ADC.

BACKGROUND

Perpendicular recording has been developed in part to achieve higher recording density than is realized with longitudinal recording devices. A PMR write head typically has a main pole layer with a small surface area at an ABS, and coils that conduct a current and generate a magnetic flux in the main pole that exits through a write pole tip and enters a magnetic medium (disk) adjacent to the ABS. The flux is used to write a selected number of bits in the magnetic medium and typically returns through a write shield structure to a back gap connection that connects the main pole with the write shield structure. In some cases, the write shield structure may allow two return pathways where a portion of the magnetic flux from the magnetic medium passes through a write shield and then through the PP3 trailing shield, and a second magnetic flux portion may pass through a leading shield and a return pass shield (RTP) above a read head that is formed below the write head in a combined read-write structure. A PMR head which combines the features of a single pole writer and a double layered medium (magnetic disk) has a great advantage over LMR in providing higher write field, better read back signal, and potentially much higher areal density.

Unfortunately, not all of the magnetic flux returning to the write head from the magnetic medium follows the preferred pathways mentioned above. PMR writers often include side shields adjacent to the main pole layer and separated therefrom by a side gap dielectric layer. It is believed that the root cause of STE is characterized as flux from the main pole tip going into the magnetic medium and returning to the side shield bottom corners and inner edges that adjoin the side gap. Both bit error rate (BER) and noise amplitude based STE measurements indicate the side writing fields are strong at these side shield bottom corners and inner edges. In general, STE is defined as adjacent track erasure for tracks located more than 0.1 microns from a center track position.

Perpendicular magnetic recording has become the mainstream technology for disk drive applications beyond 150 $Gbit/in^2$. As the demand for high data rate (HDR) drives based on PMR head technology has increased, STE robustness becomes more and more important in order to minimize +/−2 track and beyond bit error rate (BER) loss and servo erasure when multiple writing up to 100kX is applied. With the growing demand for cloud storage and cloud-based network computing, high and ultra high data rate recording becomes important for high-end disk drive applications. Thus, it is essential to design a PMR writer that can achieve high area density capability (ADC) in addition to improved STE robustness.

SUMMARY

One objective of the present disclosure is to provide a PMR shield design that enables improved control over PP3 trailing shield magnetization orientation in order to deliver improved STE or enhanced ADC performance.

Another objective of the present disclosure is to provide an improved shield design according to the first objective such that PP3 trailing shield magnetization orientation is well controlled by a method of magnetic initialization including hard magnetic initialization (HMI) and reverse magnetic initialization (RMI).

These objectives are achieved by modifying the shape of a typical PP3 trailing shield as seen from a top-down view where there are two short sides having a first length and aligned orthogonal to the ABS, and connecting to a longer backside having a first width aligned in a cross-track direction and parallel to the ABS. Thus, three connecting linear shapes define the sides of a conventional PP3 trailing shield that are not formed along the ABS such that the backside is a first height from the ABS and the two short sides are separated by the first width. Due to the essentially rectangular shape of the PP3 shield, there is no strong preferred magnetic orientation after an initialization field is applied. As a result, some devices have good STE and some devices have poor STE as indicated by a bimodal shape in a STE plot of delta BER vs. offset position. By introducing additional sides between the PP3 trailing shield front side and backside, shape anisotropy is generated such that PP3 magnetization is substantially in a single cross-track direction along the front side and backside to force nearly 100% of devices into an orientation with improved ADC and where STE is maintained, or into an orientation with improved STE and a possible slight impact on ADC.

According to a first embodiment, the PP3 trailing shield has a so-called tree top shape from a top-down view in a down-track direction. There is a front side formed along the ABS with a center section adjoining the ABS, a second tapered section on each side of the center section with each second tapered section having one end connected to an end of the center section, and a second end connected to an end of a third section where the third section is parallel to the ABS and recessed a first distance therefrom. Two short sides having a second length less than the first length, and formed equidistant from a center plane that is orthogonal to the ABS and bisects the PP3 trailing shield, extend from a second (far) end of the third section in a direction orthogonal to the ABS. A backside having a width less than the first width is formed parallel to the ABS. A sloped section connects each end of the backside with an end of a short side where the short side end is a second height from a third section. As a result, there is a first width between the two short sides in a cross-track direction, and a first height between the ABS and the backside where the first height is greater than the second height. During HMI or RMI in a cross-track direction, essentially all of the PMR writer devices built with a PP3 trailing shield tree top shape exhibit improved PP3 magnetization control with orientation in the initialization direction.

According to a second embodiment, the PP3 trailing shield backside has a cross-track dimension that is equal to or less than the first width in the process of record (POR) design where there is a substantially rectangular shape from a top-down perspective. Furthermore, the front side shape is modified by removal of the third section such that the tapered section end that is opposite the center section is connected to a side sloped section at a first distance from the ABS. Thus, each of the two short sides from the POR design are modified to each have two sloped sections that meet at a first plane aligned parallel to the ABS and formed a second distance therefrom that is greater than the first distance. A first sloped section on either side of the center plane has an end connected to a end of a tapered front side section and extends to a meeting point on the first plane such that the distance between the two meeting points on the first plane is equal to or less than the first width. Preferably, each first sloped section forms an angle <90 degrees with the first plane so that the distance between the two meeting points is greater than the backside cross-track width. There is a second short side section between each meeting point and an end of the backside where each second sloped section also forms an angle <90 degrees with respect to the first plane.

In a third embodiment, the features of the second embodiment are retained except the first plane may be formed more than the second distance from the ABS and the PP3 shield backside is greater than 20 microns from the ABS. Accordingly, one or both of the first sloped section and second sloped section lengths are increased compared with the second embodiment. The distance between the two meeting points along the first plane may be the same as in the second embodiment.

According to a fourth embodiment, the features of the first embodiment are retained except the two short sides of the PP3 trailing shield are each replaced by two sloped sections forming an angle $\phi$ that is <90 degrees. An end of a first sloped section is connected to an end of a third front side section while an end of a second sloped section becomes a coplanar extension of the sloped section in the first embodiment. As a result, the backside cross-track width is substantially less than the first width but the backside is a first height of about 5-20 microns from the ABS.

There is a fifth embodiment that incorporates features from the first and second embodiments. In particular, the front side shape from the first embodiment is maintained and an end of a front side third section is connected to a short side that is orthogonal to the ABS on each side of the center plane. Furthermore, the backside may have a first width in a cross-track direction, and is a first height from the ABS. The backside and front side may be separated by four portions of PP3 trailing shield from a top-down perspective where the first portion adjoining the front side and a third portion have essentially a rectangular shape. Meanwhile, a second portion between the first and third portions, and a fourth portion adjoining the backside have sloped sides facing away from a center plane, and a third width greater than the first width, and greater than a width of the first and third portions.

DETAILED DESCRIPTION

Figure 1:
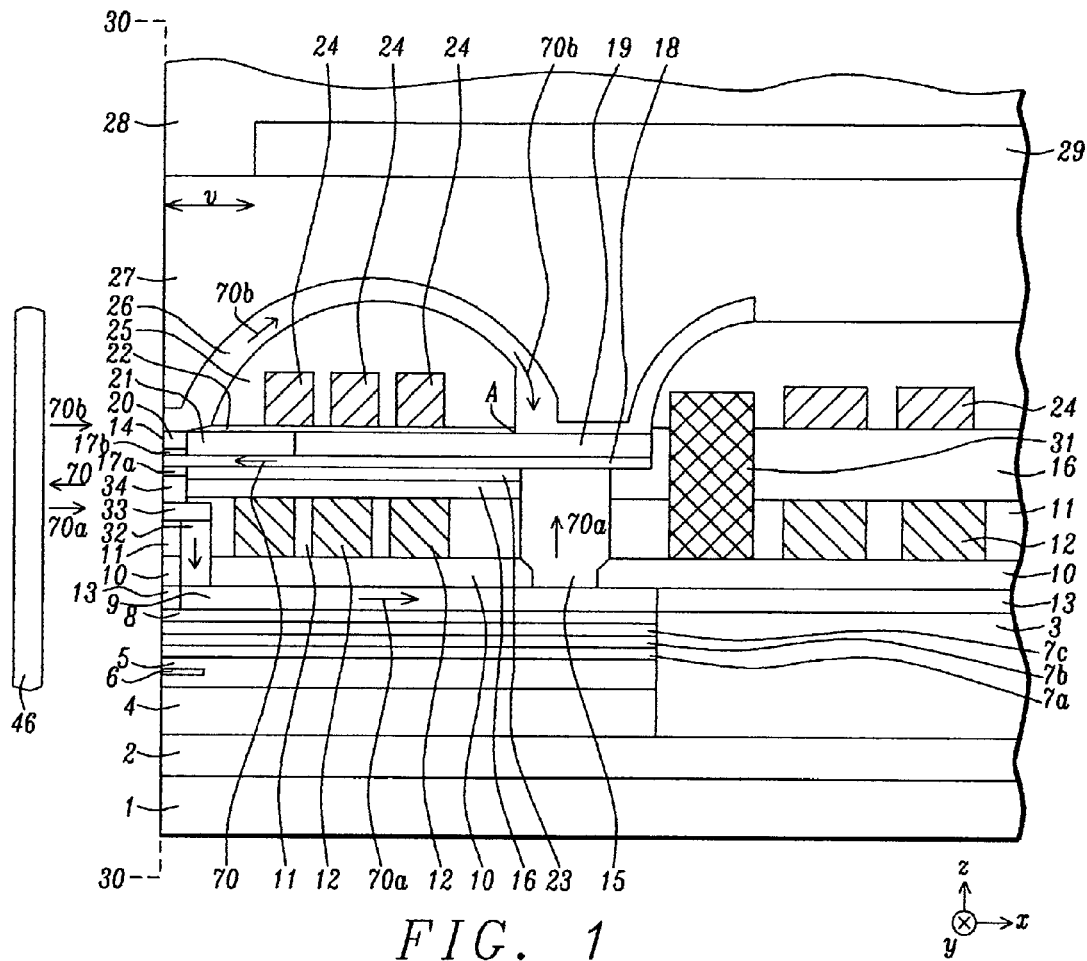
FIG. 1 is a cross-sectional view showing a read/write head structure according to a current process of record as practiced by the inventors.

The present disclosure relates to a PMR writer wherein a PP3 trailing shield has a shape from a top-down view in a down-track direction that is not substantially rectangular in order to generate shape anisotropy and force a magnetization orientation therein in a certain direction following magnetization initialization. The PMR writer may have a combined read head/write head structure. Furthermore, the PP3 trailing shield of the present disclosure is compatible with various write head designs including a dual magnetic flux return scheme involving leading shield and trailing shield structures, and a single magnetic flux return pathway through a trailing shield structure. In the drawings, the y-axis is a cross-track direction, the z-axis is a down-track direction, and the x-axis is in a direction orthogonal to the ABS and towards a back end of the device.

Referring to FIG. 1, a PMR writer with a combined read head/write head structure currently fabricated by the inventors is depicted in a cross-sectional view from a plane that is orthogonal to an air bearing surface (ABS) 30-30. The combined read head/write head is formed on a substrate 1 that may be comprised of AlTiC (alumina+TiC). Those skilled in the art will recognize that layers 2-8 represent the read head portion of the recording device while layers 9-31 represent the write head portion. The substrate is typically part of a slider (not shown) formed in an array of sliders on a wafer. After the read head/write head is completed, the wafer is sliced to form rows of sliders. Each row is typically lapped to afford an ABS before dicing to fabricate individual sliders that are used in magnetic recording devices.

The present disclosure anticipates that one or more dynamic fly height (DFH) heater elements (not shown) may be formed in one or more insulation layers in the PMR writer structure to control the extent of thermal expansion (protrusion) along the ABS toward a magnetic medium 46 during a read or write process. Read gap (RG) and write gap (WG) protrusion may be tuned by the choice of metal or alloy selected for the DFH heater elements since each DFH heater resistor material has a particular thermal and mechanical response to a given electrical input.

A first insulation layer 2 that may be comprised of alumina or another dielectric material is disposed on substrate 1. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7a. A magnetoresistive element or sensor 6 is formed in the read gap 5 along the ABS 30-30 and typically includes a plurality of layers (not shown) in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media. Resistance across the read gap changes as the moment in the second ferromagnetic layer rotates. A "0" or "1" magnetic state can be defined depending on whether the two ferromagnetic layers are magnetically aligned in the same direction or in an anti-parallel fashion. The non-magnetic layer in the sensor 6 may be comprised of Cu in a giant magnetoresistive (GMR) sensor, or may be an insulator such as alumina or MgO in a tunneling magnetoresistive (TMR) sensor.

A first top shield (S2A) layer 7a, thin insulation layer 7b, S2B shield layer 7c, insulation layer 8, and return path (RTP) 9 are formed sequentially on the read gap 5. Top shield layers 7a, 7c may be made of the same magnetic material as in the S1 shield 4. Insulation layer 8 may be the same dielectric material as in insulation layer 2. RTP 9 is preferably recessed from the ABS, and may serve as a flux return path in the write head portion by transmitting flux through return pathway 70a from a leading shield 34 and leading shield bridge (LSB) layer 33 into a back gap connection 15 and then into main pole 18.

The present disclosure encompasses various configurations of a write head structure that is employed with the read head portion. In the exemplary embodiment, there is an insulation layer 10 formed on the RTP 9 and between the ABS 30-30 and the back gap connection 15. Bucking coils 12 are disposed on insulation layer 10 and are wound in series with an opposite polarity to that in the driving coils 24 to minimize direct coupling between the trailing shield 20 and driving coils. A 3+3T coil design with three turns in each of the coils 12, 24 below and above the main pole layer 18 is depicted although a different number of coil turns (1+1T, 2+2T, or 4+4T) may be used. An insulation layer 11 that is typically comprised of a photoresist layer or alumina separates bucking coil turns from each other. There is an insulation layer 13 along the ABS that separates a S2C shield 32 and an end of RTP 9 from the ABS. The S2C shield is formed between the first bucking coil and the ABS, and adjoins a top surface of the RTP. Top surfaces of insulation layers 11 and bucking coil layer 12 are coplanar in this embodiment. Insulation layers 10, 11, 13 are comprised of a dielectric layer and the bucking coil layer is typically a conductive material such as Cu. Back gap connection 15 may be made of NiFe, CoFe, CoFeNi, or the like and magnetically couples the main pole layer 18 to the RTP 9. The RTP, S2C shield as well as leading shields 33, 34 are typically made of 10 kG or 16 kG materials while the main pole is a 19-24 kG material.

An insulation layer 16 is formed on insulation layers 11, 13 and on bucking coil layer 12 and a first section extends from a back side of the leading shield 34 to the back gap connection 15. Both of the insulation layers 11, 16 have a second section on the opposite side of the back gap connection 15 with respect to the ABS. Above the insulation layer 16 is a main pole layer 18 that may be comprised of NiFe, CoFe, CoFeNi, or another magnetic material. Main pole layer 18 has a write pole tip 14 at the ABS 30-30 and extends toward the back end of the device with a sufficient length to connect with back gap connection 15. The leading shield is separated from the main pole layer by a lead gap 17a. A first write shield layer 20 has a bottom surface formed on a write gap 17b at the ABS and extends a throat height distance (not shown) away from the ABS 30-30 to a front side of non-magnetic layer 21. The first write shield layer 20 also known as the first trailing shield may be made of CoFeN, CoFeNi, NiFe, or CoFe, for example, and may be coplanar with the non-magnetic layer 21. The first write shield may be a composite that includes a lower high magnetic (19-24 kG) "hot seed" layer contacting a top surface of the write gap. The trailing shield functions as a flux return pole and is magnetically coupled to the main pole through a second trailing shield portion named PP3 26. Trailing shield layers 20, 26 are typically made of 16 kG or 19 kG materials except for the hot seed layer component.

There is a top yoke 19 adjoining a back end of the non-magnetic layer and contacting a top surface of the main pole layer 18. The top yoke transmits magnetic flux to the main pole layer where the flux 70 is concentrated at the write pole tip 14. Yoke length is defined as the distance from the ABS to point A where the top yoke touches the inner corner of PP3. In some designs, there is a bottom yoke 23 adjoining a bottom surface of the main pole layer and recessed from the ABS in order to provide the write head with a faster response. There is an insulation layer 22 formed on a portion of the non-magnetic layer 21 and yoke 19. Passing a current through the driving coil layer 24 that is disposed on the insulation layer 22 generates magnetic flux in the top yoke 19 and in the main pole layer. As mentioned earlier, the driving coil layer 24 may have 1T, 2T, 3T, or 4T design. In the exemplary embodiment, three turns are depicted above the main pole layer. Bucking coils are connected to driving coils through connector 31.

First trailing shield 20 is separated from write pole tip 14 at the ABS by a write gap 17b that is made of an insulation material. Trailing shield layer 26 referred to as PP3 is formed on first trailing shield 20 at the ABS and on a non-magnetic layer 21 that extends to a front side of the top yoke. In the exemplary embodiment, the PP3 trailing shield arches over the first three driving coils in layer 24 and connects with the top surface of the top yoke 19 in a region overlying the back gap connection 15. In other words, a top surface of the PP3 trailing shield has substantial curvature. An insulation layer 25 is formed on the insulation layer 22 and fills the openings between the turns of driving coil layer 24 and the space between the driving coils and the arched PP3 shield layer 26. A protection layer 27 covers PP3 and is made of an insulating material such as alumina. Above the protection layer and recessed a certain distance from the ABS 30-30 is an optional cover layer 29 that is preferably comprised of a low CTE material such as SiC that serves to reduce the WG protrusion rate. The SiC cover layer is recessed to avoid introducing a material at the ABS with different mechanical and etch resistance properties than adjacent layers which could adversely affect back end lapping and ion beam etching processes. An overcoat layer 28 is the uppermost layer in the write head.

The PMR writer in FIG. 1 has two pathways for magnetic flux to return to the write head from a magnetic medium 46. For example, magnetic flux 70 from main pole layer 18 exits through pole tip 14 into the magnetic medium and may return via pathway 70a through leading shield 34 at the ABS, and then through a leading shield bridge (LSB) layer 33 into the S2C shield 32 before reaching RTP 9 and entering the back gap connection 15. The S2C shield and RTP are recessed from the ABS and separated therefrom by insulation layer 13. Flux from the magnetic medium also returns to the write head via pathway 70b by entering first write shield 20 at the ABS and then passing through PP3 trailing shield 26 and through the top yoke 19 to the main pole layer. The dual flux return pathway design is employed to reduce STE.

Figure 14A:
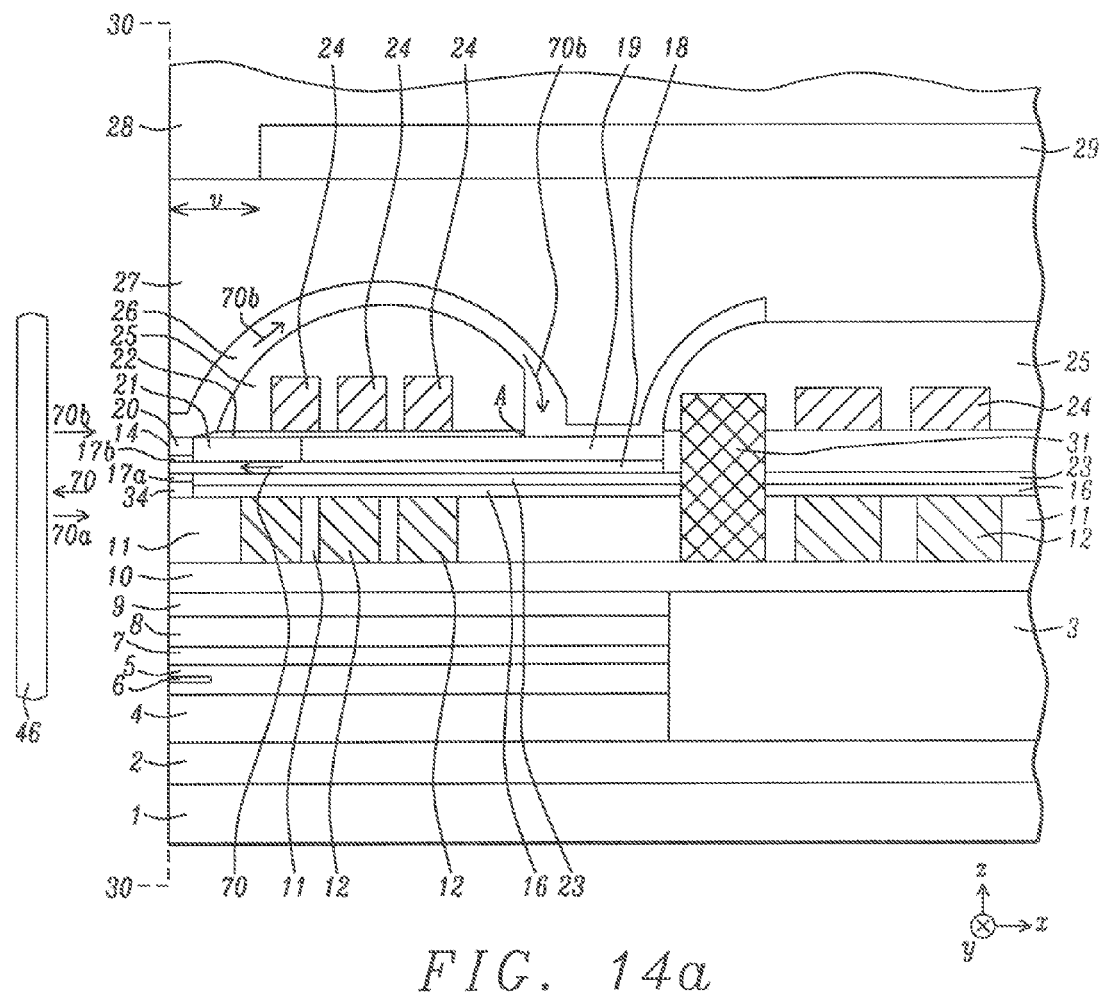
FIG. 14a is a down-track cross-sectional view of a PMR writer of the present disclosure wherein a leading loop for magnetic flux return to the main pole from a magnetic medium is omitted.
Figure 14B:
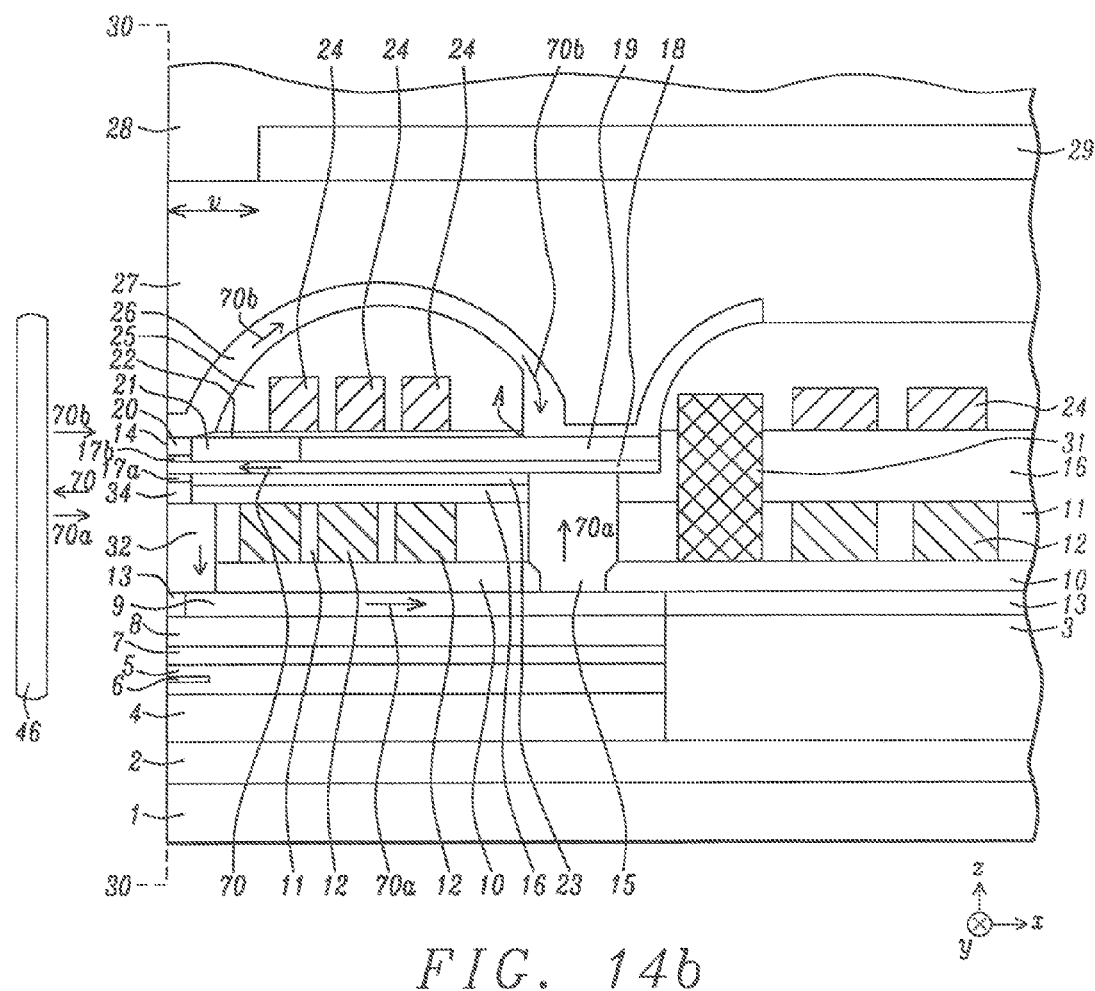
FIG. 14b is a down-track cross-sectional view of a PMR writer that includes another leading loop design for magnetic flux return to the main pole according to an embodiment of the present disclosure.

In an alternative write head design pictured in FIG. 14a, the LSB 33, S2C shield 32, and back gap connection (BGC) 15 may be omitted to form a so-called non-double write shield (non-DWS) design without a return loop for magnetic flux through a leading shield structure. Layer 9 serves as the S2B shield in the read head but not as a RTP, and layer 7 is the S2A shield. In another alternative write head design found in FIG. 14b, LSB 33 is omitted while S2C 32 is exposed at the ABS 30-30 and contacts a bottom surface of leading shield 34 so that a double write shield (DWS) design where leading return loop 70a, and trailing return loop 70b are retained similar to FIG. 1. In either FIG. 14a or 14b, one or more portions of the BGC may be comprised of non-magnetic material to promote a greater flux density in the trailing return loop 70b by creating substantial magnetic impedance in leading return loop. For example, in FIG. 1, the BGC may be considered to have four portions from bottom to top that are replaced in FIG. 14a by insulation layers 10, 11, 16, and 23, respectively. FIG. 14b differs from FIG. 1 in that RTP 9 also functions as the S2B shield in the read head while S2A layer 7 serves as the lower magnetic layer in the top shield structure represented by S2A/insulation layer 8/S2B.

Figure 2:
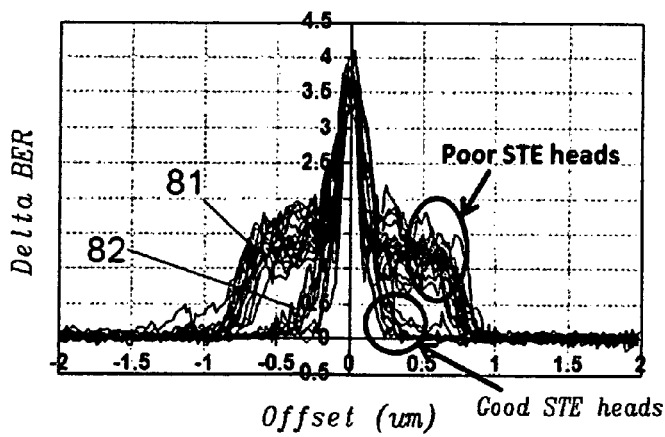
FIG. 2 is a plot illustrating bimodal STE for a plurality of PMR devices where delta BER is shown as a function of offset from a center track position.

Referring to FIG. 2, STE results for a PMR writer with a conventional PP3 trailing shield shape are shown in the form a plot of delta BER (bit error rate) vs. offset from a center track position. Values of dBER represent degradation in the BER rate in adjacent tracks within 2 microns of the center track after the recording head has written on the center track (not shown) for a certain number of cycles, typically 10K-100K or more. Bimodal STE is observed with a number of curves 82 that show relatively low dBER outside of a center track width of +/−0.1 microns on either side of the center (0 micron) position, and a number of curves 81 with relatively high dBER between 0.1 and 1 um and between −0.1 and −1 microns from the center track position. Curves 82 represent a desired response associated with PMR writers with "good" STE while curves 81 represent PMR writers with "poor" STE where accidental erasure of tracks up to 1 to 1.5 microns away from a center track position is much more likely to occur than in devices exhibiting "good" STE.

Figure 3:
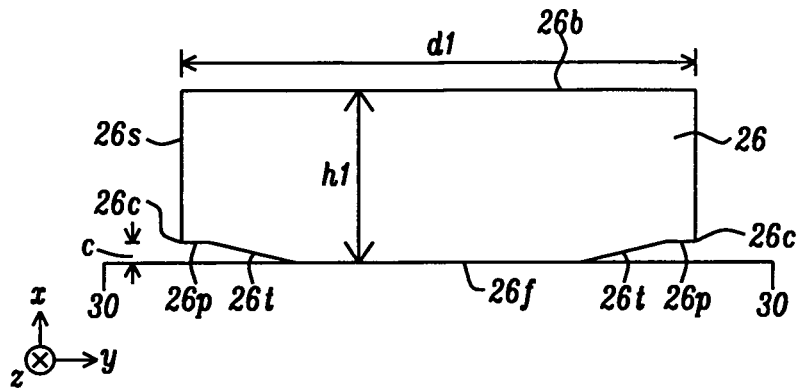
FIG. 3 is a top-down view of a conventional PP3 trailing shield where sides form a substantially rectangular shape proximate to the ABS.

FIG. 3 depicts a top-down view of a PP3 trailing shield 26 shape currently fabricated by the inventors according to a process of record (POR). The POR PP3 shield has a substantially rectangular shape with two short sides 26s aligned perpendicular to the ABS 30-30 and a backside 26b having a cross-track width d1 and formed parallel to the ABS. The POR PP3 shield front side has a center section 26f at the ABS. Each end of the center section is connected to a tapered section 26t that extends to an end of a third section 26p wherein the third section is formed parallel to the ABS and recessed a distance c therefrom. A second end of each third section is connected to a short side at corner 26c. The backside is a first height h1 from the center section in an x-axis direction. Each tapered section forms an angle of about 8 to 15 degrees with respect to the ABS.

Figure 4A:
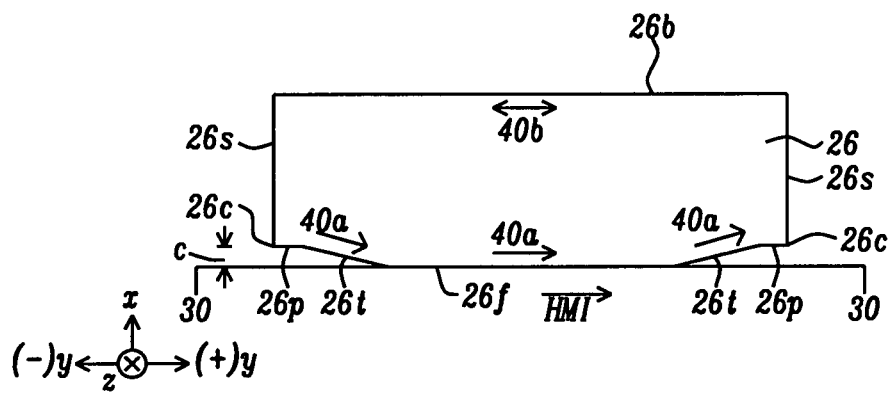
FIGS. 4a-4b are top-down views showing magnetization in the PP3 shield of FIG. 3 after HMI and RMI, respectively.

In FIG. 4a, magnetization orientation in the POR PP3 shield from FIG. 3 is illustrated after a hard magnet initialization (HMI) in a (+) y-axis direction. In particular, magnetization 40a along the front sections 26t, 26f is weakly pinned in the same direction as the HMI direction. However, along the backside 26b, there is no preference for a magnetization direction. As a result, magnetization 40b may be aligned either in a (+) y-axis or (−) y-axis direction. The final state of magnetization 40b may affect the orientation of magnetization 40a. The bi-directional magnetization 40b is associated with undesirable bimodal STE results in FIG. 2 where about 50% of devices have poor STE and 50% of devices have good STE.

Figure 4B:
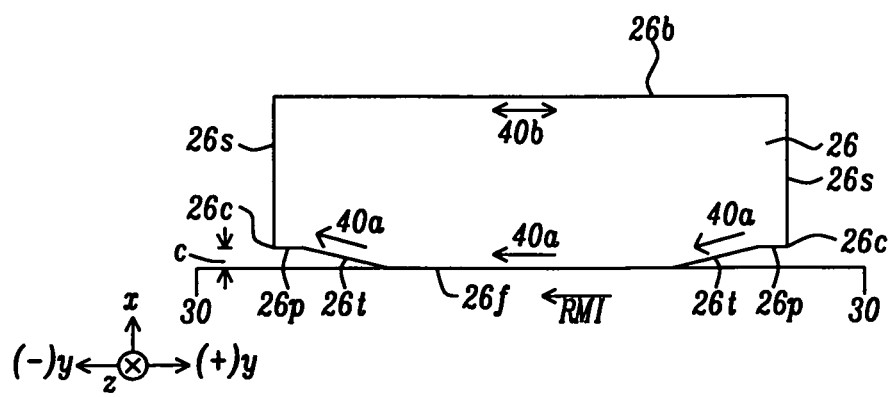

Likewise, after a reverse magnet initialization along the (−) y-axis direction as depicted in FIG. 4b, front side magnetization is weakly aligned in the same (−) y-axis direction as the RMI while backside magnetization 40b has no directional preference and may be aligned in either a (+) y-axis or (−) y-axis direction. Again, bimodal STE results are associated with bi-directional magnetization as in FIG. 4b.

Figure 5:
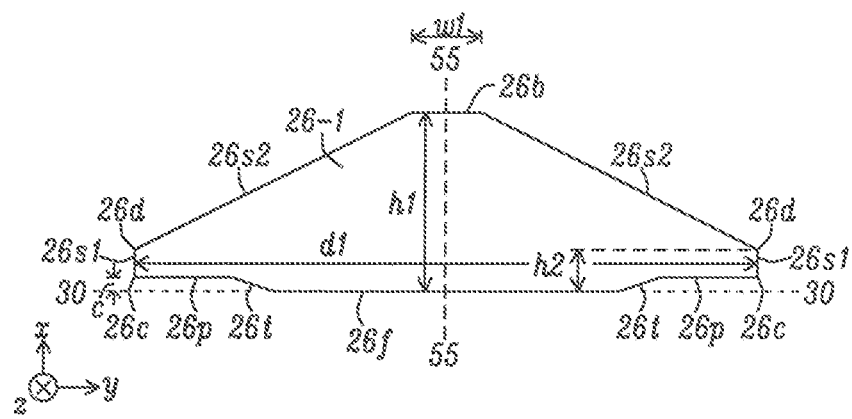
FIG. 5 is a top-down view in a down-track direction of a PP3 trailing shield having a tree top design according to an embodiment of the present disclosure.

Referring to FIG. 5, a first embodiment of the present disclosure is illustrated from a top-down view in a down-track direction and represents a so-called tree top design for PP3 shield 26-1. Similar to the POR PP3 shield shape, there is a front side formed along the ABS 30-30 with a center section 26f adjoining the ABS, a second tapered section 26t on each side of the center section with each second tapered section having one end connected to an end of the center section, and a second end connected to a near end of a third section 26p. Each third section has a far end at corner 26c and is parallel to the ABS and recessed a first distance c therefrom. However, the substantially rectangular POR PP3 shield shape is modified so that there are more than three sides needed to form the remaining boundary of the PP3 trailing shield shape. Two short sides 26s1 are equidistant from a center plane 55-55 formed orthogonal to the ABS and that bisects the front section 26f and PP3 trailing shield. Each of the two short sides connects to a third section 26p at a corner 26c and extends orthogonal to the ABS to a second corner 26d that is a second height h2 substantially less than first height h1 from the ABS and center section 26f. A backside 26b has a width w1 substantially less than the first width d1 between the two short sides. There are two sloped sections 26s2 wherein each sloped section extends from an end of the backside to an end of a short side at a corner 26d. The backside may have the first height h1 from the ABS. As a result, shape anisotropy is built into the PP3 trailing shield 26-1 and serves to provide an advantage in terms of improved STE or better area density capability (ADC) as explained later.

In all embodiments of the PP3 trailing shield of the present disclosure, h1 is from 5 to 20 microns, and preferably about 14 microns in order to match a typical read head sensor 6 height while d1 is from 5 to 60 microns, and preferably about 42 to 48 microns. In the tree top embodiment depicted in FIG. 5, second height h2 may be between 2 and 8 microns. First distance c is preferably from 0.5 to 1.5 microns. Tapered sections 26t form an angle between 8 and 15 degrees with respect to the ABS.

Figure 6A:
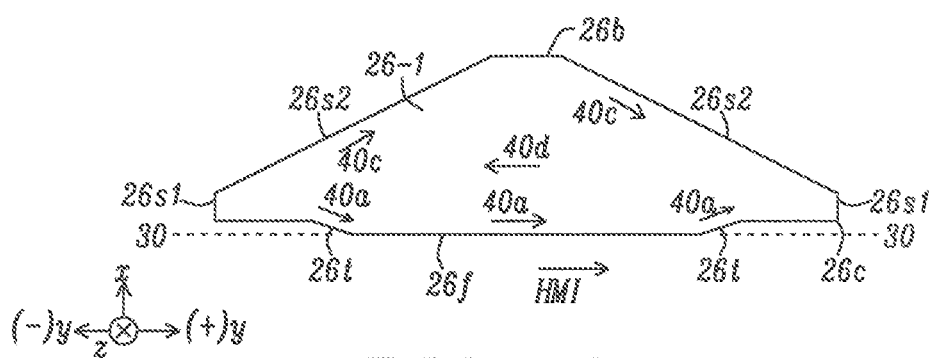
FIGS. 6a-6b are top-down views showing magnetization in the PP3 shield in FIG. 5 after HMI and RMI, respectively.

Referring to FIG. 6a, magnetic orientation within the tree top PP3 shield is shown after HMI. A key feature is that the PP3 shield 26-1 shape forces essentially one magnetization 40c in the same direction as the HMI direction along backside 26b. In the exemplary embodiment, magnetizations 40c/40d/40a form a stable three domain configuration with magnetizations 40a, 40c substantially in the (+) y-axis direction, and magnetization 40d substantially in the opposite or (−) y-axis direction. Therefore, PP3 trailing shield 26-1 exhibits improved PP3 magnetization orientation control over the conventional rectangular shape since all PMR writer devices with the first embodiment design have PP3 magnetization aligned in essentially a stable three domain configuration with more determined directions along the PP3 shield edges, and not in two possible opposing directions as in the POR PP3 trailing shield shape.

Figure 6B:
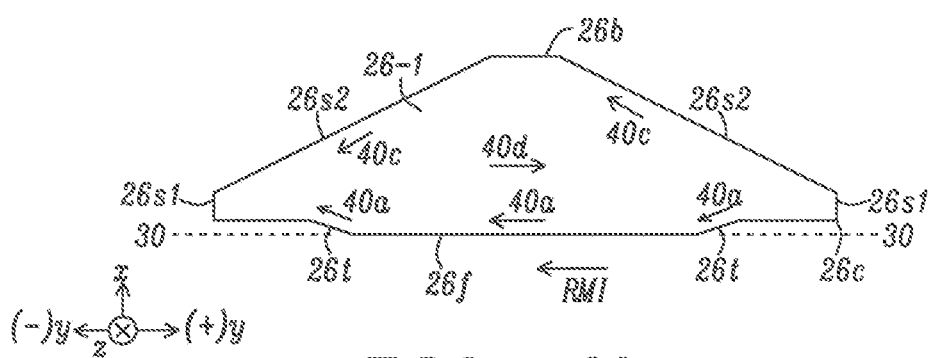

In FIG. 6b, magnetic orientation with PP3 trailing shield 26-1 is depicted after RMI. A key feature is that magnetizations 40a, 40c are substantially in the same (−) y-axis direction as the RMI direction, and magnetization 40d is in the opposite or (+) y-axis direction in this case. Again, PP3 trailing shield 26-1 exhibits improved magnetization orientation control over the POR PP3 trailing shield since essentially 100% of PMR writer devices have PP3 trailing shield magnetization aligned in a stable three domain configuration with more determined directions along PP3 shield edges. Another important advantage is that magnetization orientation control is insensitive to small magnetic field disturbances since both HMI and RMI generate a substantially stable magnetization direction within PP3 trailing shield 26-1.

Figure 7:
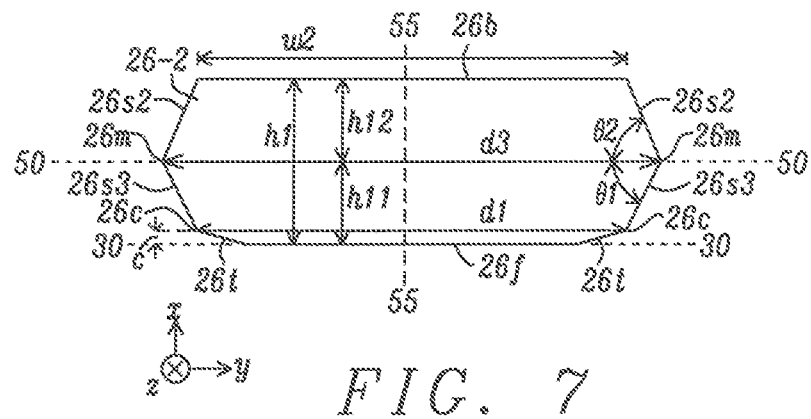
FIGS. 7-11 are top-down views of PP3 trailing shield designs according to second through fifth embodiments of the present disclosure.

Referring to FIG. 7, a second embodiment of the present disclosure is illustrated and represents a PP3 trailing shield 26-2 that is a modification of the POR PP3 trailing shield. In particular, each of the two sides 26s in the POR design is replaced on each side of center plane 55-55 by two sloped sections 26s2, 26s3 that are formed end to end at a meeting point 26m on plane 50-50 that is parallel to the ABS 30-30. Preferably, the cross-track width d3 between points 26m is greater than the first width between corners 26c. Each sloped section 26s3 is connected to a far end of a tapered section 26p at a corner 26c, and forms an angle θ1<90 degrees with plane 50-50. Each sloped section 26s2 is connected to an end of backside 26b and forms an angle θ2<90 degrees with plane 50-50. In this embodiment, the third section 26p on the PP3 front side is omitted such that a tapered section 26t has one end connected to an end of the center section and a second (far) end at a corner. First distance c is maintained between each corner 26c and the ABS. Backside 26b is a first height h1 from front side center section 26f, and h1=h11+h12 where h11 and h12 are the distances between plane 50-50 and front section 26f, and between plane 50-50 and backside 26b, respectively. In some embodiments, backside width w2 may be greater than d1. However, the present disclosure also anticipates PP3 trailing shield 26-2 shapes where w≤d1. Center plane 55-55 is orthogonal to the ABS and bisects front side center section 26f. Following HMI or RMI, magnetic orientation within PP3 trailing shield 26-2 is substantially in a stable three domain configuration similar to that shown in FIG. 6a and FIG. 6b, respectively.

Figure 8:
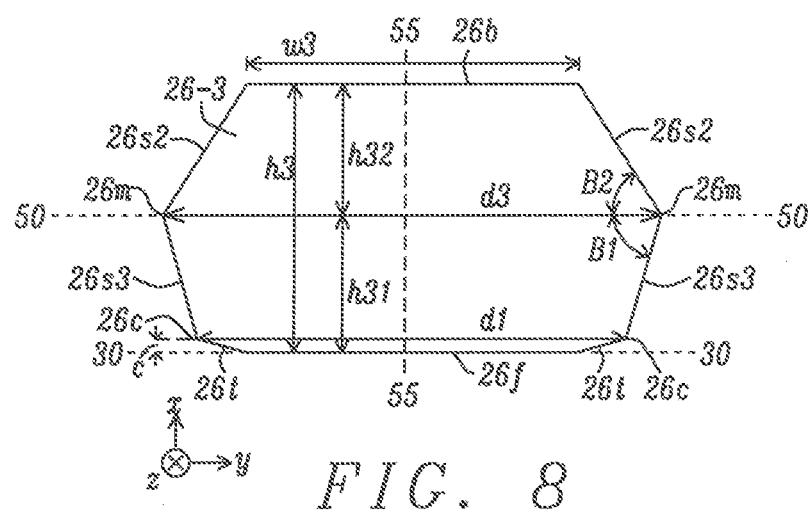

In FIG. 8, a third embodiment of the present disclosure is shown where PP3 trailing shield 26-3 is a modification of PP3 trailing shield 26-2. All features from the second embodiment are retained. However, there is a third height h3 between front section 26f and backside 26b where h3>h1. For example, h3 may be up to 22 microns in magnitude. Moreover, h3=h31+h32 where h31 and h32 are the distances between plane 50-50 and front section 26f, and between plane 50-50 and backside 26b, respectively. In one aspect, h31=h11 from FIG. 7, and h32>h12, or h31>h11 and h32=h12. In another embodiment, h31 is greater than h11 and h32>h12. When h31>h11, the angle β2 formed between sloped side 26s2 and plane 50-50 is typically greater than β2 if the width w3 of backside 26b is equal to width w2 in FIG. 7. In another embodiment, w3<w2 and angle β2=angle θ2.

Figure 9:
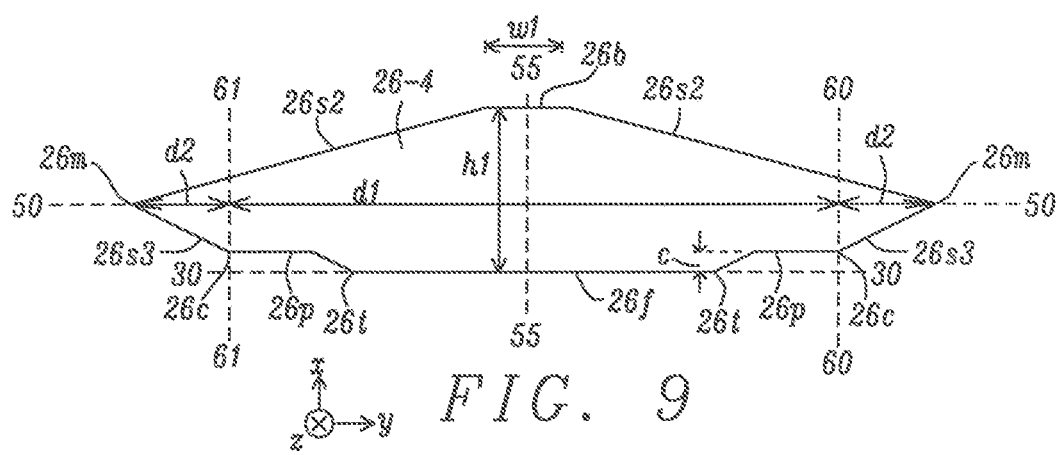

Referring to FIG. 9, a fourth embodiment of a PP3 trailing shield structure of the present disclosure is illustrated where PP3 trailing shield 26-4 is a modification of the first embodiment. In particular, backside 26b having cross-track width w1, and height h1 from the front side center section 26f is retained. In addition, corners 26c at the ends of third sections 26p are a first width d1 from each other in a cross-track direction. However, each short side 26s1 in FIG. 5 is replaced by a sloped section 26s3 that has one end connected to third section at corner 26c and a second end at meeting point 26m on plane 50-50. Furthermore, sloped section 26s2 extends from an end of the backside to plane 50-50 at meeting point 26m. As a result, the cross-track distance between meeting points 26m on plane 50-50 is d1+2d2 where d2 is the distance on each side of center plane 55-55 between meeting point 26m and a point on plane 60-60 or plane 61-61 formed parallel to the center plane and passing through a corner 26c. Angle φ formed between sloped section 26s2 and sloped section 26s3 is typically less than 90 degrees.

Figure 10:
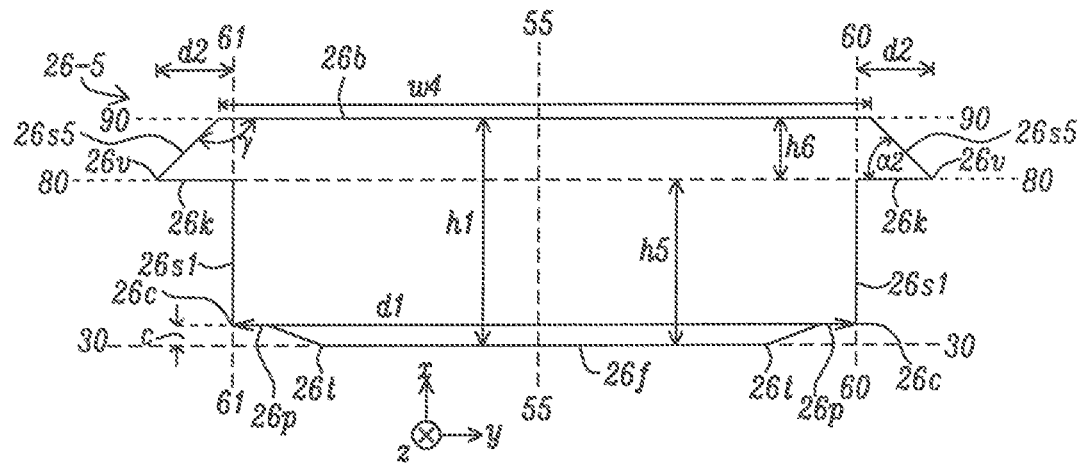

In FIG. 10, a fifth embodiment of a PP3 trailing shield structure is shown that incorporates features from the first and second embodiments. For example, in PP3 trailing shield 26-5, the front side shape from the first embodiment is maintained, and on each side of the center plane 26f, there is a far end of a front side third section 26p connected to a side 26s1 that is orthogonal to the ABS 30-30. Corners 26c are formed on planes 60-60 and 61-61 as in the previous embodiment, and are separated from each other by a first cross-track width d1. Backside 26b is a first height h1 from the front side center section and has a cross-track width w4 that may be greater than d1. In other embodiments, w4≤d1. A critical feature is that the backside and a sloped section 26s5 form an angle γ>90 degrees in order to induce shape anisotropy within the PP3 trailing shield. Sloped section 26s5 extends from an end of the backside to an end 26v on a plane 80-80 that is parallel to the ABS and located a height h5 therefrom, and is a height h6 from the backside. There is an ABS facing side 26k formed along plane 80-80 between plane 60-60 and an end 26v, and between plane 61-61 and the other end 26v. In embodiments where w4<d1, the ABS facing sides may be between plane 60-60 and plane 61-61 on each side of the center plane. It should be understood that although the exemplary embodiment shows h5>h6, the third height may be less than the second height. However, h5+h6=h1.

Figure 11:
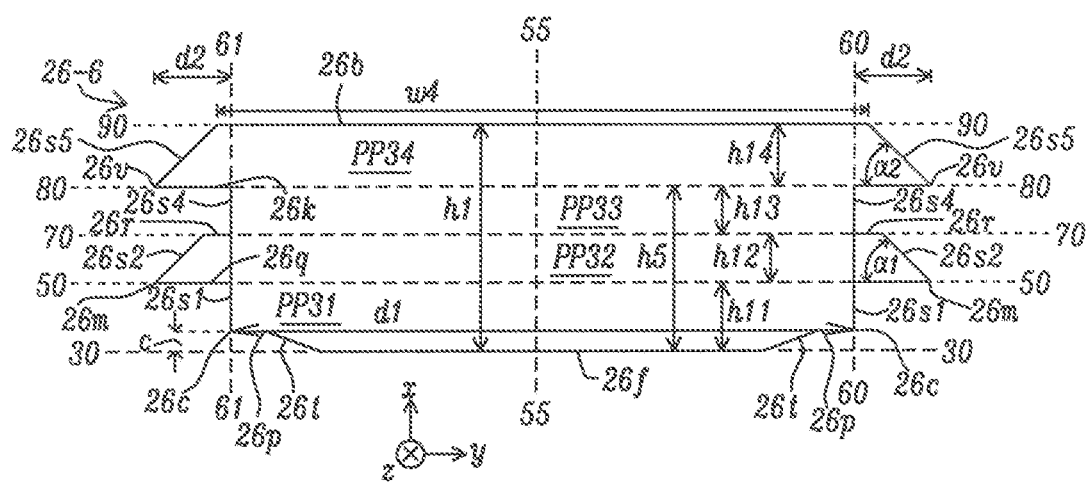

In FIG. 11, the fifth embodiment is modified to give a PP3 trailing shield 26-6 that includes a second sloped section 26s2 on each side of the center plane 55-55. The PP3 trailing shield may be comprised of four portions from a top-down perspective where the first portion adjoining the front side and a third portion have a substantially rectangular shape and a first width d1. Meanwhile, a second portion between the first and third portions, and a fourth portion adjoining the backside have a width (d1+2d2) and sloped sections facing away from the ABS. In other embodiments, the backside has a width w4<d1.

In one aspect, each of the PP3 trailing shield portions is formed between planes that are parallel to the ABS. First portion PP31 is between the ABS 30-30 and plane 50-50, and third portion PP33 is between plane 70-70 and plane 80-80 where PP31 and PP33 have a height h11 and h13, respectively. Second portion PP32 is between plane 50-50 and plane 70-70 while fourth portion PP34 is between plane 80-80 and plane 90-90 that coincides with backside 26b. PP32 and PP34 have a height h12 and h14, respectively, in an x-axis direction such that h11+h12+h13+h14=h1. Preferably, each of h11, h12, h13, and h14 is from 3 to 4 microns. Portion PP31 has a short side 26s1 along each plane 60-60 and 61-61 where the aforementioned planes are equidistant from and parallel to center plane 55-55. Portion PP33 also has a short side 26s4 formed along plane 60-60 and one short side 26-4 along plane 61-61.

Portion PP32 has a front (ABS facing) side 26q that adjoins a backside of portion PP31 along plane 50-50, and extends a distance d2 in a cross-track direction from each plane 60-60 and 61-61. The second portion has a backside 26r along plane 70-70 and extends a distance less than d2 from each plane 60-60 and 61-61. A sloped section 26s2 has an end connected to an end of front side 26q at meeting point 26m on each side of center plane 55-55 such that the distance between meeting points is (d1+2d2). Angle α1 between sloped section 26s2 and side 26q is less than 90 degrees. A second end of each sloped section 26s2 connects to an end of backside 26r.

Portion PP34 has a front side 26k that adjoins a backside of the third portion along plane 80-80, and extends a distance d2 from each plane 60-60 and 61-61. In some embodiments, the fourth portion has backside 26b that extends a distance less than d2 from each plane 60-60 and 61-61. In other embodiments, backside width w4 is less than d1. There is a sloped section 26s5 with an end connected to an end of front (ABS facing) side 26k at end point 26v on each side of center plane 55-55 such that the distance between end points 26v is (d1+2d2). A second end of each sloped section 26s5 connects to an end of backside 26b. Angle α2 between sloped section 26s5 and side 26k is less than 90 degrees. A key feature is that the backside forms an angle greater than 90 degrees with sloped section 26s5 so that shape anisotropy is built into the PP3 trailing shield.

Figure 12A:
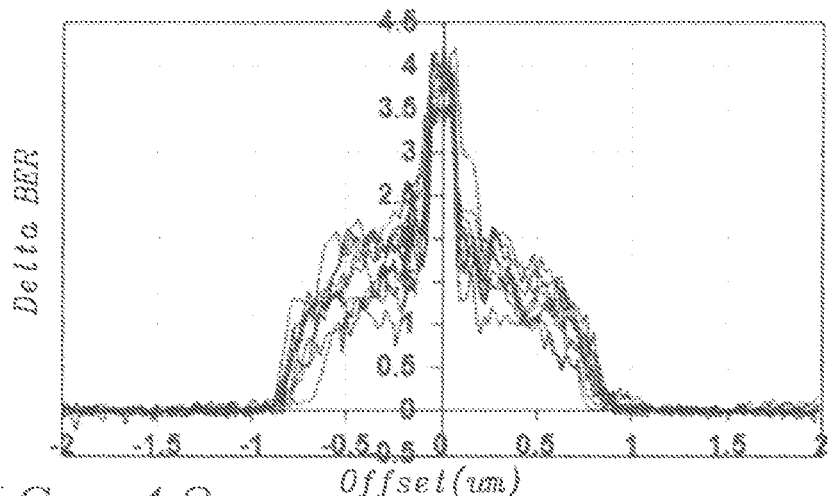
FIGS. 12a-c are STE results of PMR writers having a tree top PP3 shield shape according to the first embodiment of the present disclosure.

To demonstrate the effectiveness of PP3 trailing shield magnetization orientation control provided by the PP3 trailing shield shape of the first embodiment, dBER is plotted as a function of offset from a center track position in FIG. 12a after HMI comprising a magnetic field of 6000 Oe for 15 seconds is applied to several PMR writer devices. Essentially all of the devices exhibit a single mode similar to that of curves 81 in FIG. 2. Although the FIG. 12a results indicate a "poor STE" condition, a gain in area density control (ADC) is achieved compared with a POR PP3 trailing shield design. Moreover, the poor STE condition may be mitigated by modifications to other write head components such as incorporating an arch shape for the PP3 trailing shield from a cross-sectional view and thinning the leading shield as described in a later section.

Figure 12B:
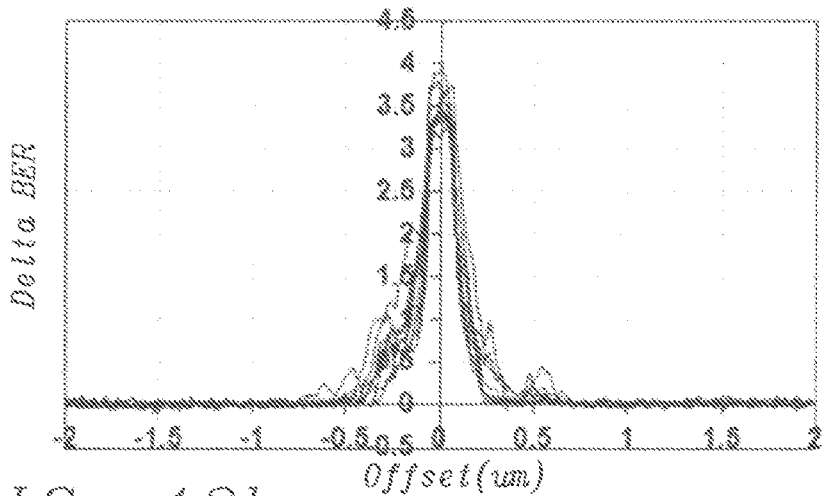

In FIG. 12b, dBER is shown as a function of center track offset after RMI comprising a magnetic field of 6000 Oe for 15 seconds. In this case, improved STE is observed because the bimodal result in FIG. 2 for the POR PP3 shape is replaced by substantially reduced dBER in tracks more than 0.1 micron away from the center track position.

Figure 12C:
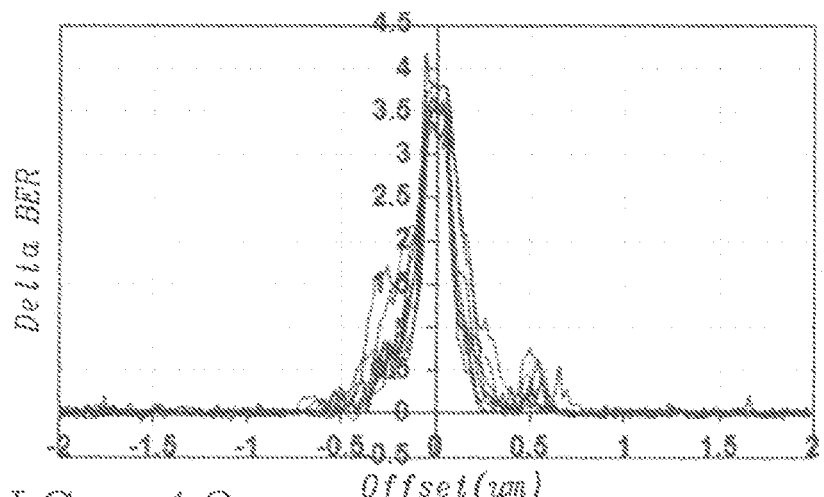

Referring to FIG. 12c, dBER results are depicted for a plurality of PMR devices that are first subjected to RMI (6000 Oe field) followed by HMI (500 Oe field). Note that there is very little difference between the FIG. 12b and FIG. 12c results that indicates robustness in the initialization process as related to magnetization orientation control in the PP3 trailing shield because of the built in shape anisotropy described previously.

In another performance study involving a PMR writer with a tree top shaped PP3 trailing shield, a center track is squeezed by writing different random patterns at both sides for 50 times. Erase width in AC mode (EWAC), center track bit error rate (BER) without squeeze, and center track bit error rate after squeeze (SqBER) are measured after HMI and again after RMI. HMI is found to give improved performance results compared with RMI as shown in Table 1. However, there is a trade off because of poor STE associated with HMI. Size refers to the 18 PMR writer devices included in the study. Common readers were used in order to eliminate reader performance variation after HMI and RMI.

TABLE 1

Tree top PP3 performance comparison by common reader

| Initialization type | Size | EWAC (nm) | BER | dBER | SqBER |
|---|---|---|---|---|---|
| HMI | 18 | 0.080 | −5.04 | −1.18 | −3.85 |
| RMI | 18 | 0.081 | −5.00 | −1.32 | −3.68 |

Figure 13A:
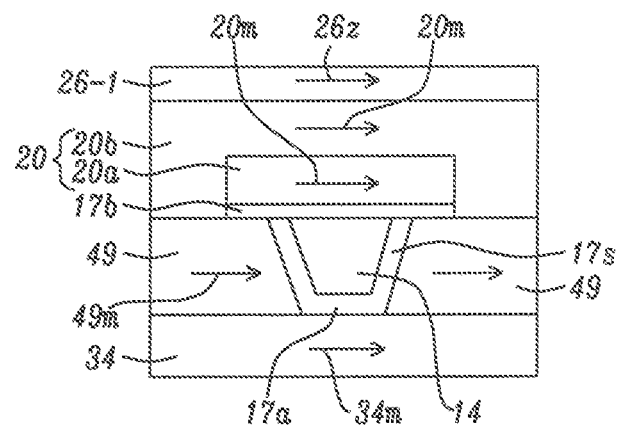
FIG. 13a is a cross-sectional view showing HMI direction in various shields of a PMR writer.

In a modeling study, we have found that PP3 trailing shield initialization direction can change the write shield and side shield magnetization directions. In a first example illustrated by an ABS cross-sectional view in FIG. 13a, all shields including leading shield 34, side shields 49, first trailing shield 20, and PP3 trailing shield 26-1 are initialized by HMI in the same y-axis direction wherein HMI direction is represented by 34m, 49m, 20m, and 26z, respectively. Write pole tip 14, lead gap 17a, side gaps 17s, and write gap 17b are also shown from this perspective. In FIG. 13a, there is a composite first trailing shield including a lower hot seed layer 20a contacting a top surface of the write gap, and an upper first trailing shield 20b adjoining a top surface and sides of the hot seed layer. Modeling results (not shown) indicate that after HMI, the composite first trailing shield also known as the write shield (WS), has a magnetization aligned in the HMI direction while side shield (SS) magnetization is opposite to that of the HMI direction.

Figure 13B:
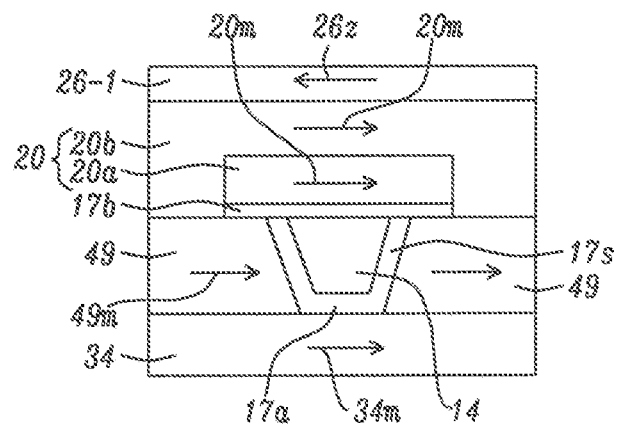
FIG. 13b is a similar view except the top PP3 shield is initialized by RMI according to a modeling study of the present disclosure.

In FIG. 13b, another example is shown where PP3 trailing shield 26-1 is initialized by RMI in a y-axis direction opposite to that of the y-axis initialization direction (by HMI) for leading shield 34, side shields 49, and first trailing shield (WS) 20 as depicted by RMI direction 26z opposed to that of HMI direction 34m, 49m, and 20m. Modeling results (not shown) indicate that the initialization conditions represented in FIG. 13b cause both of the WS and SS magnetizations to be aligned in the RMI direction after RMI is applied. Therefore, magnetization in the SS or WS following the initialization condition in FIG. 13b would be more robust against stray fields since the SS and WS are ferromagnetically coupled and are more difficult to switch than in the outcome from the first example (FIG. 13a) where WS and SS magnetization are anti-ferromagnetically coupled after HMI.

In summary, if a high density disk (HDD) or high data rate (HDR) drive design can tolerate poor STE, the incorporation of a PP3 trailing shield shape disclosed herein will provide improved PP3 magnetization orientation control after HMI thereby enabling a boost in area density capability (ADC) of around 2% to 3%. In other cases, where ADC is satisfactory for hard drive performance, PMR writers having PP3 trailing shield shapes as defined herein will deliver significantly improved STE performance with perhaps a slight impact on ADC after RMI.

As indicated earlier, it is also possible to realize both improved STE and better ADC by incorporating shape anisotropy in the PP3 trailing shield according to embodiments of the present disclosure and modifying other components in the write head. For example, the thickness of the leading shield 34 (FIG. 1) may be reduced from a range of 0.2 to 0.25 microns to 0.1 to 0.15 microns to improve STE under a condition where HMI is applied to a PP3 trailing shield structure shown in FIG. 5 or in FIGS. 7-11. Thus, STE is enhanced over a POR PP3 trailing shield design because of the thin leading shield, and there is also better ADC because of the effect of the modified PP3 trailing shield design after HMI.

Figure 15:
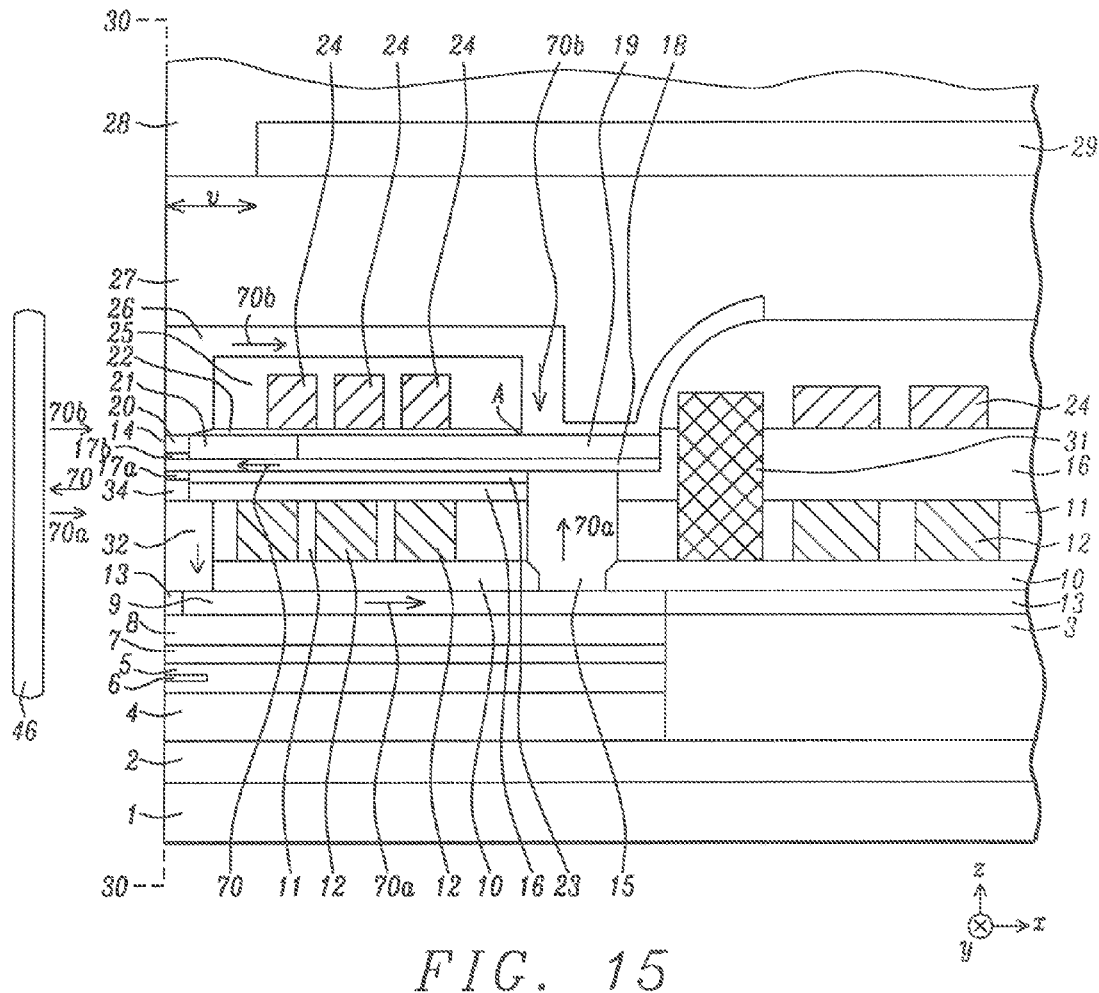
FIG. 15 is a modification of the embodiment in FIG. 14b where the PP3 trailing shield has a planar top surface from a down-track cross-sectional view.

We have previously disclosed in U.S. Pat. No. 8,274,758 a method for fabricating a PP3 trailing shield in a write head, and depicted embodiments where the PP3 trailing shield may have an arch (dome) shape or a planar shape with a flat top surface from a cross-sectional view. Furthermore, in U.S. Pat. No. 8,593,761, we disclosed that the dome shape for the PP3 trailing shield leads to a reduction in wide area track erasures (WATE). The PP3 trailing shield 26 is shown with a dome shape from a down-track cross-sectional view in FIG. 1, FIG. 14a, and FIG. 14b according to various embodiments of the present disclosure. A planar shape for the PP3 trailing shield is pictured in FIG. 15 and represents a modification of the embodiment shown in FIG. 14b where all features are retained except for the shape of the PP3 trailing shield that has a flat top surface 26t.

Figure 16:
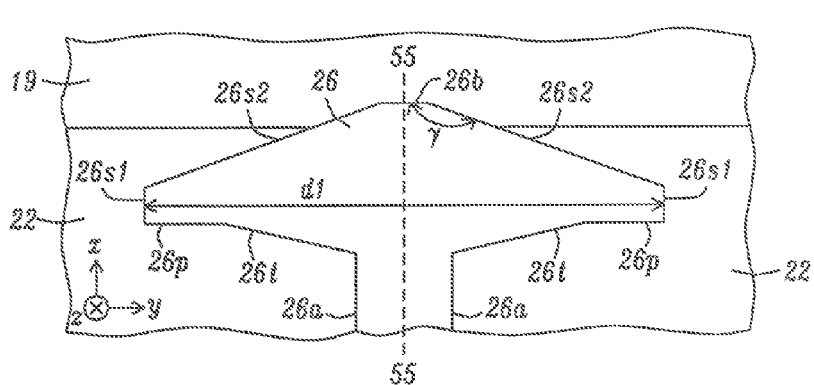
FIG. 16 is a top-down view of an intermediate PP3 trailing shield shape prior to a lapping process that forms an ABS.

A method of forming a PMR writer of the present disclosure involves a conventional sequence of steps that are known to those skilled in the art and are not described herein except for the step of forming the PP3 trailing shield from an intermediate PP3 trailing shield structure. In the exemplary embodiment, an intermediate shape of the PP3 trailing shield 26-1 from a top-down view in a down-track direction is depicted in FIG. 16 as an example. A bottom surface (not shown) of the PP3 trailing shield contacts a top surface of the first trailing (write) shield 20 that is hidden in this perspective, and also contacts a portion of insulation layer 22 along a front side end section 26p and tapered section 26t, and a top surface of yoke 19 along a backside 26b. There is a front section having sides 26a extending in an x-axis direction away from an end of tapered section 26t and away from the backside on each side of center plane 55-55. As described previously with respect to FIG. 1, the first trailing shield contacts a top surface of the write gap 17b that is formed on the main pole layer 18. A key feature is that sloped section 26s2 forms an angle γ>90 degrees with backside 26b in order to provide shape anisotropy in the PP3 trailing shield such that a subsequent HMI or PMI forces a magnetization orientation in substantially the same y-axis direction along both of the backside and front side. During a subsequent lapping process that forms ABS 30-30 in FIG. 5, front section 26a and portions of the tapered sections are removed to provide a front side center section 26f at the ABS. The write gap 17b and first trailing shield also have a side at the ABS.

While the present disclosure has been particularly shown and described with reference to, the preferred embodiment thereof, it will be understood by those skilled in the art that various changes in form and details may be made without departing from the spirit and scope of this disclosure.

We claim:

1. A PMR writer with a shield structure, comprising:
    (a) a first trailing shield layer formed on a write gap and adjoining an air bearing surface (ABS), the write gap contacts a top surface of a main pole layer at the ABS; and
    (b) a second (PP3) trailing shield that adjoins a top surface of the first trailing shield and with a front side having a center section at the ABS, the front side has two end sections parallel to the ABS and each having a near end proximate to the center section and a far end opposite the near end, and recessed a first distance from the ABS, the PP3 trailing shield is magnetically connected to a back portion of the main pole layer and has a top-down shape from a down-track direction perspective, comprising:
    (1) the front side;
    (2) a first side with a first end connected to the far end of each front side end section, and formed parallel to a center plane that is orthogonal to the ABS and which bisects the PP3 trailing shield center section, and a second end that is a second distance from the ABS;
    (3) a backside that is a first height from the ABS, has a second width less than the first width, and is aligned parallel to the ABS; and
    (4) a sloped section that connects to the second end of the first side and to an end of the backside on each side of the center plane.

2. The PMR writer of claim 1 wherein the front side is further comprised of a tapered section formed at an angle of about 8 to 15 degrees with respect to the ABS on each side of the center plane, each tapered section extends from an end of the front side center section to the near end of the front side end section.

3. The PMR writer of claim 1 further comprised of a leading shield at the ABS, the leading shield is separated from a bottom surface of the main pole layer by a lead gap and is magnetically connected to a return pass (RTP) that is recessed from the ABS and extends to a back gap connection, the leading shield captures a portion of magnetic flux from a magnetic medium and together with the RTP and back gap connection provides a return pathway for the magnetic flux to the main pole layer.

4. The PMR writer of claim 1 wherein the first width is about 5 to 60 microns and the first height is about 5 to 20 microns.

5. The PMR writer of claim 1 wherein the PP3 trailing shield has a magnetic orientation along the front side and along the back side that is substantially in a first cross-track direction after hard magnet initialization.

6. The PMR writer of claim 5 wherein the PP3 trailing shield has a magnetic orientation along the front side and along the back side that is substantially in a second cross-track direction opposite to the first cross-track direction after reverse magnet initialization.

7. The PMR writer of claim 3 wherein the leading shield has a thickness in a down-track direction of about 0.1 to 0.15 microns to minimize skip track erasure.

8. The PMR writer of claim 1 wherein the PP3 trailing shield has a dome or planar shape from a down-track cross-sectional view.

* * * * *